(12) United States Patent
Nelson (10) Patent No.: US 7,007,952 B2
(45) Date of Patent: Mar. 7, 2006

(54) EDUCATIONAL BOARD GAME

(76) Inventor: Christine Nelson, 26861 Trabuco Rd., Suite E73, Mission Viejo, CA (US) 92691

( * ) Notice: Subject to any disclaimer, the term of this patent is extended or adjusted under 35 U.S.C. 154(b) by 82 days.

(21) Appl. No.: 10/368,161

(22) Filed: Feb. 14, 2003

(65) Prior Publication Data

US 2003/0218302 A1 Nov. 27, 2003

Related U.S. Application Data

(60) Provisional application No. 60/406,390, filed on Aug. 27, 2002, provisional application No. 60/374,959, filed on Apr. 23, 2002.

(51) Int. Cl.
A63F 3/00 (2006.01)

(52) U.S. Cl. ..................... 273/242; 273/236

(58) Field of Classification Search ............... 273/242, 273/243, 244, 248, 252, 236
See application file for complete search history.

(56) References Cited

U.S. PATENT DOCUMENTS

| | | |
|---|---|---|
| 143,338 A | 9/1873 | Higgins |
| 266,628 A | 10/1882 | Hyde |
| 618,114 A | 1/1899 | Mayer |
| 952,997 A | 3/1910 | Sanderson |
| 1,320,817 A | 11/1919 | Yost |
| 1,375,308 A | 4/1921 | Mathes |
| 1,597,562 A | 8/1926 | Allen |
| 2,008,189 A | 7/1935 | Rippon |
| 2,199,499 A | 5/1940 | Kreitler |
| D170,753 S | 11/1953 | Fukal |
| 3,242,591 A | 3/1966 | Adams |
| 3,495,833 A | 2/1970 | Wesley |
| 3,767,203 A | 10/1973 | Eaker |
| 3,942,800 A | 3/1976 | Holbrook |
| 4,273,337 A * | 6/1981 | Carrera et al. ............. 273/243 |
| 4,557,485 A | 12/1985 | Lardon |
| 4,625,970 A | 12/1986 | Childs et al. |
| 4,654,988 A | 4/1987 | Erickson |
| 4,937,181 A | 6/1990 | Rogers |
| 5,009,430 A | 4/1991 | Yuhasz |
| 5,123,846 A | 6/1992 | Lewis |
| 5,147,043 A | 9/1992 | Gould |
| 5,257,939 A | 11/1993 | Robinson et al. |
| 5,259,763 A | 11/1993 | Wendel et al. |
| 5,288,075 A * | 2/1994 | Kelley ....................... 273/243 |

(Continued)

OTHER PUBLICATIONS

Ex.Parte Breslow 192 USPQ 431.*

(Continued)

Primary Examiner—Vishu K. Mendiratta
(74) Attorney, Agent, or Firm—Knobbe, Martens, Olson & Bear, LLP (57) ABSTRACT

An educational game comprises a planar game board having printed thereon a plurality of images of postal stamps. The educational game further comprises a plurality of player placeholders. The educational game further comprises a plurality of question cards. A first portion of the question cards contain questions of reduced difficulty having associated therewith a first quantity of points. A second portion of the question cards contain questions of intermediate difficulty having associated therewith a second quantity of points. A third portion of the question cards contain questions of increased difficulty having associated therewith a third quantity of points. A portion of the question cards contain questions having subjective answers. A portion of the question cards contain an image of a postal stamp. When a player answers a question correctly, the player's score is incremented by the quantity of points associated with that question.

15 Claims, 2 Drawing Sheets

U.S. PATENT DOCUMENTS

| | | | |
|---|---|---|---|
| 5,377,991 | A | 1/1995 | Olsen |
| 5,454,569 | A | 10/1995 | Walker |
| 5,487,548 | A * | 1/1996 | Daly et al. .................. 273/431 |
| 5,660,390 | A | 8/1997 | Ginzburg et al. |
| 5,690,336 | A | 11/1997 | Oliver |
| 5,738,354 | A | 4/1998 | Easley |
| 5,755,442 | A | 5/1998 | Cudd |
| 5,800,182 | A | 9/1998 | Carson et al. |
| 5,906,371 | A | 5/1999 | Peterson |
| 5,979,752 | A | 11/1999 | Holloway |
| 5,988,366 | A | 11/1999 | Krull et al. |
| 6,425,581 | B1 | 7/2002 | Barrett |

OTHER PUBLICATIONS

*America's Spirit*, Game Instructions, Nov. 7, 2001, University Games Corporation, San Francisco, CA 94110.

*American Trivia Game, Spirit of the United States*, Game Instructions, 2001 Cardinal Industries, Inc., L.I.C., NY 11101.

*All American Trivia Board Game*, Original Edition, Game Instructions, 2001 Outset Media Corporation, 1543 Westall Ave., Victoria, BC, V8T 2G6, Canada.

Website Fantasy Toyland.com; Run Off, Board Game, printed Feb. 21, 2003.

Website Are You Game.com; Discover America, Board Game, printed Feb. 21, 2003.

Website Are You Game.com; Game of The Year, Board Game, printed Feb. 21, 2003.

* cited by examiner

EDUCATIONAL BOARD GAME

PRIORITY APPLICATION

This application claims priority under 35 U.S.C. §119(e) from U.S. Provisional Patent Application Ser. No. 60/374,959 entitled "Board Game with Questions Relating to American History and Patriotism" and filed Apr. 23, 2002; and U.S. Provisional Patent Application Ser. No. 60/406,390, entitled "Board Game with Questions Relating to American History and Patriotism" and filed Aug. 27, 2002. The entire disclosures of both of these priority documents are hereby incorporated by reference in their entirety.

FIELD OF THE INVENTION

The present invention relates generally to a board game, and more specifically to a board game requiring players to answer subjective questions relating to United States government, history and culture.

BACKGROUND OF THE INVENTION

In a conventional trivia game, an objective question is posed to a player, and if the player answers the question correctly, he or she is entitled to advance toward a winning position. If the player cannot answer the question correctly, no advancement occurs. Typically, such games are won by the player whose movement piece has traversed a predefined movement track. The questions of such games usually have specific answers, and generally comprise subject matter—often obscure—that can be divided into categories such as sports, arts, geography, politics, history, science and so forth. Such games generally require players to recall specific pieces of information for strategic advantage, and thus do not require players to think critically, answer subjective questions, collaborate, or make strategic decisions.

A variety of trivia games have been developed in accordance with the foregoing conventional trivia game theme, each with various different movement tracks and topics. For example, U.S. Pat. No. 5,377,991 (issued on 3 Jan. 1995 to Olsen) discloses a game board having dual movement tracks, and a game wherein a player's ability to recall information pertaining to the Book of Mormon is tested. Another example of a game board having multiple movement tracks is disclosed in U.S. Pat. No. 4,557,485 (issued on 10 Dec. 1985 to Lardon), which tests each player's knowledge of various subjects with objective questions. Other examples of trivia games include U.S. Pat. No. 5,454,569 (issued on 3 Oct. 1995) which challenges players' ability to correctly identify notable people, and U.S. Pat. No. 5,660,390 (issued on 26 Aug. 1997) which simulates the presidential election process. Likewise, U.S. Pat. No. 5,690,336 (issued on 25 Nov. 1997 to Oliver) and U.S. Pat. No. 6,425,581 (issued on 30 Jul. 2002 to Barrett) use similar game structures to challenge players' knowledge of geography.

SUMMARY OF THE INVENTION

In accordance with the foregoing, it is desired to develop a game which goes beyond mere recollection of specific, and often obscure, facts, and that requires the participants to think critically, answer subjective questions, collaborate and make strategic decisions. In particular, it is desired to develop a game that challenges players' knowledge and understanding of important information about United States government, history and culture. It is also desired to develop a game that will inspire the players' sense of patriotism, good citizenship and civic duty. Finally, it is desired that such a game have a unique and visually appealing appearance, thus further serving to engage the players. The educational board game disclosed herein addresses some or all of these desires.

In one preferred embodiment of the present invention, a method of playing a game comprises selecting, by a first player, a question card from one of a plurality of groups of question cards. Each group of question cards associated with a difficulty level. The method further comprises proffering a response to the selected question card by the first player. The method further comprises assigning, by at least one second player in competition with the first player, a number of points based on a subjective evaluation, by the at least one second player, of the first player's proffered response and the difficulty level of the selected question card. The method further comprises advancing a player placeholder along a movement track based on the number of points assigned. The movement track comprises a plurality of images of postal stamps, each postal stamp bearing a number corresponding to the player's score at that point on the movement track.

In another preferred embodiment of the present invention, an educational game comprises a planar game board having printed thereon a plurality of images of postal stamps. At least a portion of the postal stamps bear a number. The educational game further comprises a plurality of player placeholders. Each placeholder is configured to be positioned on the numbered stamps. When a player's placeholder is positioned on a numbered stamp, the number corresponds to the player's score. The educational game further comprises a plurality of question cards. A first portion of the question cards contain questions of reduced difficulty having associated therewith a first quantity of points. A second portion of the question cards contain questions of intermediate difficulty having associated therewith a second quantity of points. A third portion of the question cards contain questions of increased difficulty having associated therewith a third quantity of points. A portion of the question cards contain questions having subjective answers. A portion of the question cards contain an image of a postal stamp. The educational game further comprises an answer key containing answers to at least a portion of the questions on the question cards. When a player answers a question correctly, the player's score is incremented by the quantity of points associated with that question. The educational game further comprises an instruction sheet containing instructions on how to play the educational game.

In another preferred embodiment of the present invention, a method for favorably influencing attitudes and actions promoting desirable values and good citizenship while assisting youths to think critically, answer subjective questions, collaborate and make strategic decisions comprises playing an educational game. The educational game includes selecting, by a first player, a question card from one of a plurality of groups of question cards. Each group of question cards is associated with a difficulty level. The questions include both factual questions and subjective questions. At least a portion of the question cards relate to United States history, government or culture. The educational game further includes proffering a response to the selected question card by the first player. The educational game further includes assigning, by at least one second player in competition with the first player, a number of points based on a subjective evaluation, by the at least one second player, of the first player's proffered response to each subjective question and the difficulty level of the selected question card. The educational game further includes advancing a player placeholder along a movement track based on the number of points assigned. The movement track comprises a plurality of images of U.S. postal stamps, each U.S. postal stamp of a size such that at least one of the player's movement pieces can be positioned thereon. Each U.S. postal stamp in the movement track bears a number corresponding to the player's score at that point on the movement track.

In another preferred embodiment of the present invention, an educational game comprises a planar game board having printed thereon a plurality of images of U.S. postal stamps. At least a portion of the postal stamps bear a number. The educational game further comprises a plurality of player placeholders. Each placeholder is configured to be positioned on the numbered stamps, such that when a player's placeholder is positioned on a numbered stamp, the number corresponds to the player's score. The educational game further includes a plurality of question cards. The question cards contain questions for favorably influencing attitudes and actions promoting desirable values and good citizenship long after the game has been played. The educational game further includes an answer key containing answers to at least a portion of the questions on the question cards. When a player answers a question correctly, the player's score is incremented by the quantity of points associated with that question. The educational game further includes an instruction sheet containing instructions on how to play the educational game.

In another preferred embodiment of the present invention, a method for assisting youths to think critically, answer subjective questions, collaborate and make strategic decisions comprises playing an educational game. The educational game includes selecting, by a first player, a question from a group of questions including factual questions and subjective questions. The educational game further includes assigning, by at least one second player in competition with the first player, a number of points based on said second player's evaluation of the first player's response to said subjective question.

BRIEF DESCRIPTION OF THE DRAWINGS

The following drawings illustrate examples of various components of the educational board game disclosed herein, and are for illustrative purposes only. Other embodiments that are substantially similar can use other components that have a different appearance.

DETAILED DESCRIPTION OF PREFERRED EMBODIMENTS

Figure 1:
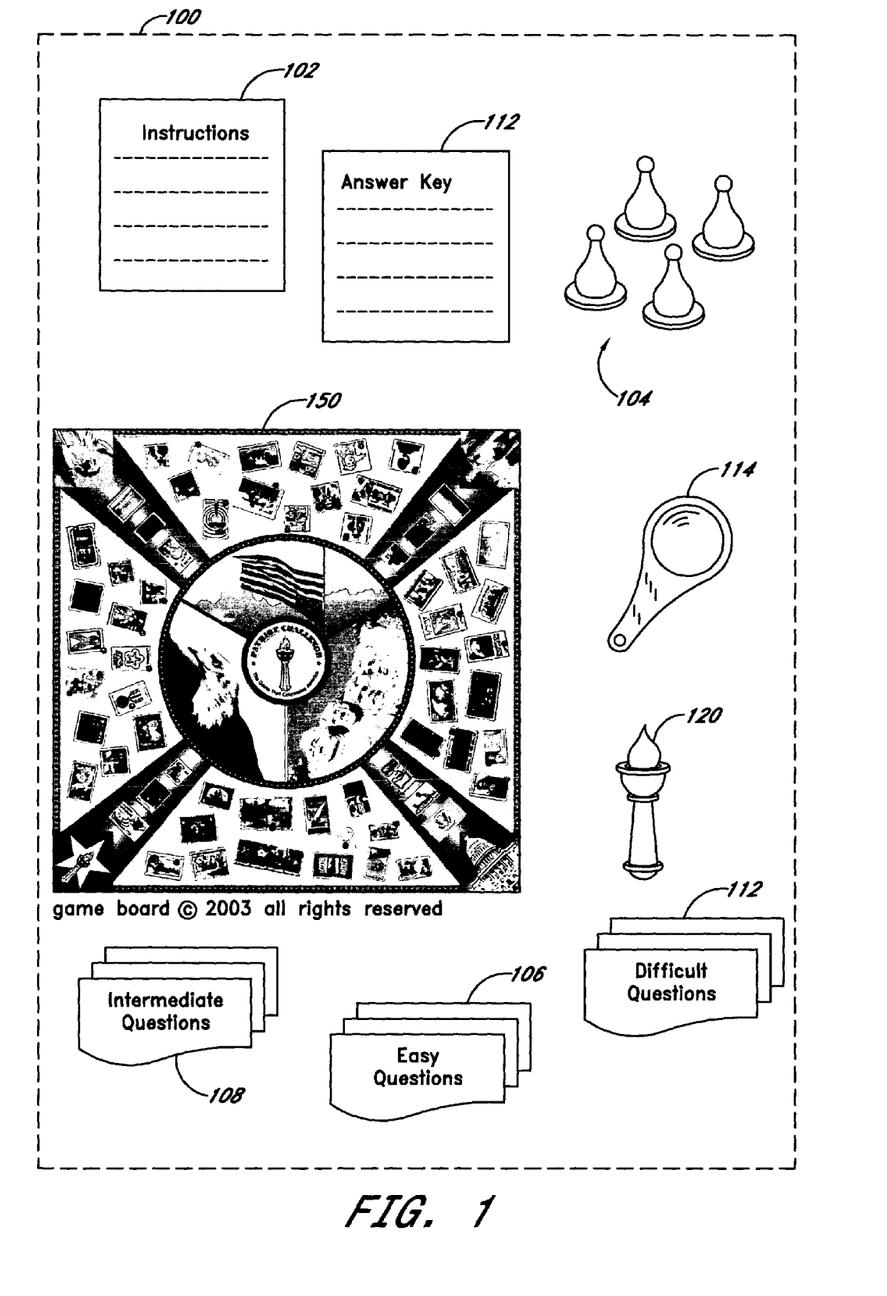
FIG. 1 illustrates a kit containing certain game components for use with a preferred embodiment of an educational board game.

Referring now to FIG. 1, a preferred embodiment of a game kit 100 containing game components for use with an educational board game is illustrated. The game kit 100 comprises game instructions 102, a game board 150, and a plurality of player movement pieces 104. The game kit 100 further comprises question cards containing easy questions 106, question cards containing intermediate questions 108 and question cards containing difficult questions 110, as well as an answer key 112. Preferably, the question cards contain both subjective and objective questions. In other embodiments, the game kit 100 may comprise other components, such as a small magnifying glass 114, additional player movement pieces, or additional question cards categorized into more or fewer difficulty classifications.

For example, in a modified embodiment, the game kit further comprises a plurality of prizes to be awarded to the game winner. For example, the prize may comprise a pin, such as a lapel pin 120, as generically illustrated in FIG. 1. In other modified embodiments, the game kit further comprises informational material such as information about the USA Freedom Corps.

The various components of the game kit 100 described above can be manufactured using conventional, well-known techniques, and can comprise conventional materials. For example, in a preferred embodiment, the game instructions 102, the answer key 112 and the question cards 108, 110, 112 comprise paper, while the player movement pieces 104 comprise plastic. In a modified embodiment, the player movement pieces 104 comprise a metal. Preferably, the game board 150 comprises a rigid material with color printing on at least one side. In certain embodiments, the question cards 108, 110, 112 also have color printing on at least one side. One example of color printing appropriate for the game board 150 and the question cards 108, 110, 112 are color reproductions of United States postal stamps.

Figure 2:
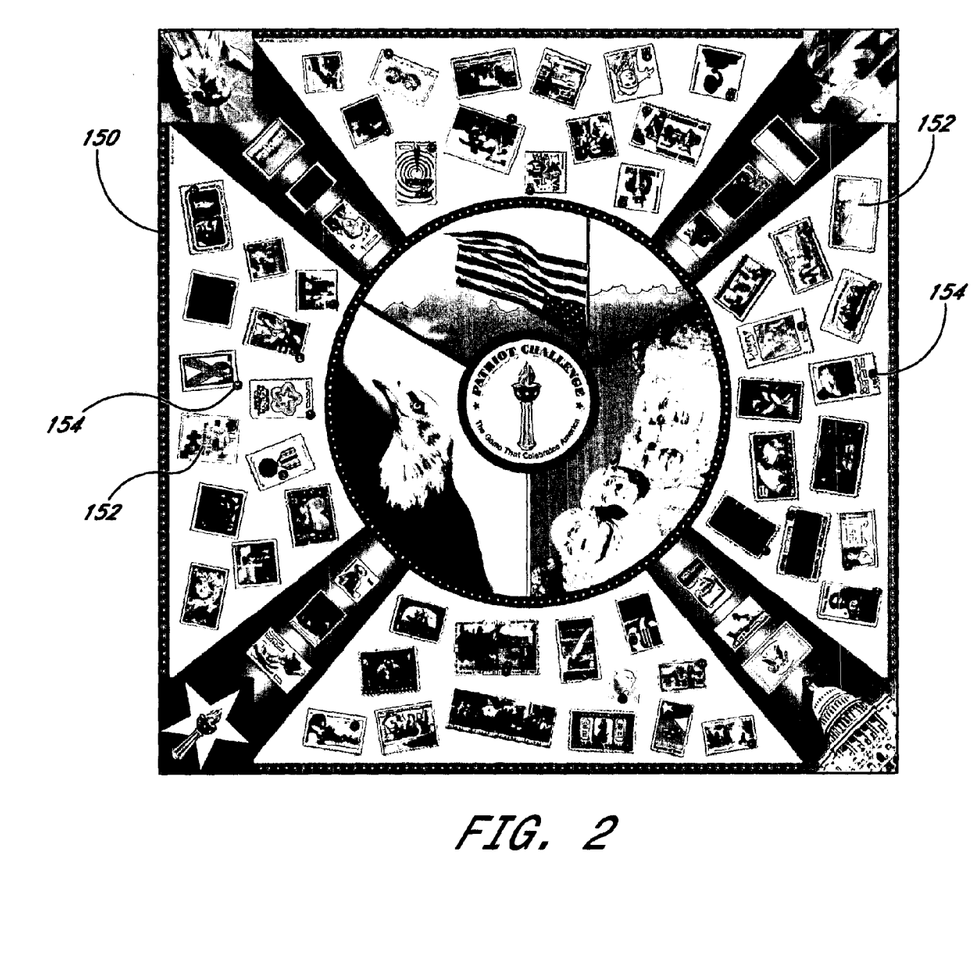
FIG. 2 illustrates a game board layout that can be used with a preferred embodiment of an educational board game.

FIG. 2 illustrates a preferred embodiment of the game board 150. As described above, the game board 150 preferably comprises a rigid material with color printing on at least one side. In the embodiment illustrated in FIG. 2, the game board 150 comprises a plurality of images of United States postal stamps 152, some of which bear a numerical label 154. Preferably, the numbered postal stamps form a player movement track of consecutive numerical labels 154. For example, in the game board 150 illustrated in FIG. 2, the numbered stamps form a player movement track numbered from 1 to 52. The player movement track can be longer or shorter in other embodiments. The postal stamps 152 are preferably of a size such that at least one of the player movement pieces can be positioned on the postal stamps 152. In a modified embodiment, the postal stamps 152 comprising the player movement track form a historical timeline. The game board 150 can comprise other artwork configured to engage game players.

The components described above, and illustrated in FIGS. 1 and 2, can be used to play an educational board game. In such a game, each player selects a player movement piece and places it at the beginning of the player movement track. Players advance their player movement pieces along the player movement track by answering objective questions correctly, and by giving responses to subjective questions that are evaluated and scored by other players, as described in greater detail below. The object of such a game is to be the first player to traverse the player movement track.

In one embodiment, play starts with the youngest player going first, and then progresses clockwise in the order that the players are positioned around the board. On a player's turn, he or she selects a question card from one of the easy questions 106, intermediate questions 108, or difficult questions 110. The player will proffer an answer to the selected question card. If the selected question card contains an objective question, one of the other players will check the accuracy of the proffered answer against the answer key 112. If the player answers an easy question correctly, he or she is rewarded two points, if the player answers an intermediate question correctly, he or she is rewarded four points, and if the player answers a difficult question correctly, he or she is rewarded six points. An incorrect answer is awarded zero points. The player then advances his or her player movement piece in accordance with the number of points received, if any, for answering the question. In other embodiments, other point values may be assigned to correct questions.

If the selected question card contains a subjective question, the player's proffered answer is judged by the other players, who collectively assign a value thereto. The selected question card may contain scoring guidelines for the answer evaluators' use. The player then advances his or her player movement piece in accordance with the number of points received, if any, for answering the question.

If the player fails to score any points for his or her proffered answer, the question card can be returned to the collection of question cards for use later in the game. If the player received points for his proffered answer, that question card is not returned to the collection of question cards.

In certain preferred embodiments of the educational board game, certain question cards contain multiple-part questions, for which the player must answer all question parts correctly to receive any points. Other question cards can contain one or more "bonus questions" for which the player can be rewarded additional points for answering an additional question correctly. Bonus questions can be subjective or objective; for subjective bonus questions, scoring is performed as described above.

If the player decides that he or she cannot answer the question on the selected question card, he or she can collaborate with one or more other players to determine the answer. If a collaborative effort yields a correct answer, then the points yielded by the correct answer are split evenly between the collaborators. However, once a player proffers an incorrect answer without collaborating, future collaboration is precluded.

In a preferred embodiment of the educational board game, the questions relate to American history, culture and government. In such embodiments, the questions do not relate to trivial information, but rather relate to important information relating to the duties and responsibilities of United States citizenship. This characteristic is advantageously emphasized with respect to the subjective questions, which encourages players to think critically and to develop their own opinions while still encouraging collaboration. This characteristic is further emphasized with the presence of United States postal stamps on the game board and the question cards. In addition, by requiring players to evaluate the answers of other players, the game encourages tolerance and generosity. This characteristic is unique over conventional trivia games, which do not encourage critical thinking and collaboration, and which do not require players to develop their knowledge of substantive contemporary issues.

In addition, the various embodiments of the educational board game described herein provide the further advantage of requiring players to perform a risk/reward analysis when they select a question to answer. As described above, a player has the option of selecting an easy, intermediate or difficult question. The more difficult the question, the more points are rewarded for a correct answer. This unique characteristic is advantageous over conventional trivia games, which do not teach principles of risk/reward.

In particular, the game described herein is much more than a recreational pastime or an educational activity. Its goal is to motivate citizens to take action in support of their country. It reminds United States citizens of their responsibilities to their country and fellow countrymen. By reviewing the country's accomplishments as a nation, the game reignites a sense of pride in the United Sates, and strengthens the players' commitment to offer their own time and talents in service to the nation.

The colorful question cards and game board with United States postal stamps evokes a sense of taking a tour of the United States "from sea to shining sea." Conventional games do not include photos or colorful graphics because it adds to the cost of producing the game. The photos included in the game described herein will inspire players to appreciate the scenic beauty of the United States, to respect the symbols of the United States democracy, and to value the countless contributions made by famous Americans.

Many conventional educational games ask the players to recall facts and information in a rote manner. While this method is the first step in the learning process, the game described herein takes players beyond rote recall to higher levels of learning by asking them to apply their knowledge in discussions and demonstrations. These higher level learning objectives facilitate the integration of knowledge into practices of daily life, helping bring to life the core democratic principles. It also makes the game more fun and enhances learning by all the players.

The game described herein seeks to favorably influence attitudes and actions long after the game is played. Playing the game gives parents an opportunity to promote desirable values, reinforce the responsibilities of good citizenship, and then to demonstrate those values to their children in their everyday life. The game can positively influence future behavior by creating a forum for the exchange of ideas and the expression of opinions, and serve as a model to demonstrate freedom of expression and tolerance for differing points of view.

Risk and reward are the principles of success in the United States. As described above, the present game reinforces these concepts within the game-playing structure. Each player selects a question card based on the point value and level of difficulty. Usually the player who takes more risk wins the game. In embodiments containing a prize, the game celebrates success by rewarding the winner with something of value that can be worn beyond the game. In such embodiments, the prize has meaning for the winner and is another way to display their patriotic spirit well beyond the confines of a board game.

In certain embodiments, as described above, the game will further stimulate citizen involvement by including information on the USA Freedom Corps and other service organizations that provide opportunities for game players of all ages to engage in volunteer service. The game will be the vehicle to bring volunteer service into focus, providing players with the information they need to get involved and turn their "love of country" into civic action.

The game disclosed herein can ignite a new wave of patriotism because it has a variety of uses and offers several opportunities to influence United States citizens, especially youth. It can be played by parents and their children to anchor patriotic spirit in the home setting. It can be used in school classrooms as a teaching tool to facilitate learning about civics. And it can be the basis for creating regional and national contests to promote citizenship and leadership principles, similar to the National Spelling Bee, and National Geography Bee, rewarding students for their knowledge and understanding of democratic principles, the United States government, and the rights and responsibilities of United States citizens.

The game disclosed herein is easily upgraded by releasing new question cards that can be used with the original game board. This approach supports continued interest in the game for the family audience and foster continued use of the game in the school environment. Subsequent editions can continue to expand learning by asking higher level questions so players can demonstrate their understanding and application of these principles in our society and in their own lives.

Examples of questions and bonus questions ("BQ") appropriate for the question cards are listed in the following table. In other embodiments, other questions can be used. In the following table, question level "A" refers to easy questions, question level "B" refers to intermediate questions, and question level "C" refers to difficult questions. The questions contained in this table are Copyright© 2003 Christine Nelson, All Rights Reserved.

| Level | Question (including Bonus Question, if any) | Answer to Question | Answer to Bonus Question |
|---|---|---|---|
| A | I am a famous symbol of the United States government. Who am I? | Uncle Sam | |
| A | Find Stamp #22 on the game board. What is this famous landmark? Bonus Question (worth 1 extra point) Where is it located? | Statue of Liberty | New York, New York City, New York Harbor, Liberty Island |
| B | Find Stamp #22 on the game board. Who gave the United States this gift? Bonus Question (worth 1 extra point) What does it represent? | France | Freedom or liberty from oppression |
| C | James Madison is one of the "Founding Fathers." What does the term "Founding Fathers" mean? | The participants at the US Constitutional Convention of 1787, especially those who signed the Constitution. | |
| B | Find Stamp #12 on the game board. In the 1830's this territory carried a flag with a single white star on it. Even today this state is referred to as the ________ ________ state? Bonus Question (worth 1 extra point) Name one president who came from this state. | Lone Star | Lyndon B. Johnson, George H. W. Bush George W. Bush |
| B | What is the name for the first 10 amendments added to the Constitution which protect the rights of all Americans? Bonus Question (worth 2 extra points) How many amendments to the US Constitution are there? | The Bill of Rights | 27 |
| A | What historic bell with the inscription "Proclaim liberty throughout the land unto all the inhabitants thereof" has a crack in it? Bonus Question (worth 2 extra points) Where can you visit this historic bell? | Liberty Bell | Philadelphia, PA |
| C | In 1969, the United States put the first man on the moon. What words did the astronaut Neil Armstrong say to the world as he took his first "moon walk"? | "One small step for man, one giant leap for mankind." | |
| A | Protocol says the US flag should be raised and lowered at these times. Bonus Question (worth 2 extra points) When is a flag flown at half-mast? | Sunrise and sunset | When a nationally known person or group of people dies |
| C | Which president said these words: "Ask not what your country can do for you. Ask what you can do for your country"? Bonus Question (worth 1 extra point) How do Americans serve their country today? | John F. Kennedy | Group Evaluation |
| A | Stand up and recite this speech as if you were the famous orator delivering it. "Is life so dear, or peace so sweet, as to be purchased at the price of chains and slavery? Forbid it, Almighty God! I know not what course others may take but as for me; give me liberty or give me death." Who gave this famous speech? | Patrick Henry | |
| B | What are the two duties of the Supreme Court? Bonus Question (worth I extra point) Decision Day is the day of the week the US Supreme Court usually announces most of its important decisions. Name the day. | Interpret the Constitution and explain the laws | Monday |
| A | This man was the main author of the Declaration of Independence and the third president of the United States. Who was he? | Thomas Jefferson | |
| C | Why did settlers travel 2,000 miles from Independence, Missouri to Oregon on the Oregon Trail? | Farmland | |
| A | Find Stamp #14. This woman was herself an escaped slave who escorted runaway slaves from one safe house to another on their journey to the Northern states and Canada. This method of helping the slaves to freedom was known as the ________ Railroad. | Underground | |
| C | In 1935, the Social Security Act created what type of insurance to assist workers who had lost their jobs during the Depression. Bonus Question (worth 2 extra points) What government assistance is available today for people who are unemployed? | Unemployment Insurance | Unemployment Insurance, job retraining, welfare, food stamps |
| B | President Franklin D. Roosevelt was famous for his "fireside chats." Where did these talks take place? Bonus Question (worth 2 extra points) How does the president communicate with the American people today? | Radio | Newspapers, magazines, TV, radio, Internet, press conferences, State of the Union Address |
| C | This president had to make the difficult decision whether to use the atomic bomb or not. He chose to use it because he thought it would hasten the end of the war and spare American lives. Who was this president? | Harry S. Truman | |
| A | Ben Franklin wanted the wild turkey to become America's official symbol. He was overruled and this bird was chosen instead. | Bald Eagle | |
| A | What is the proper placement for your right hand during the pledge? Bonus Question (worth 2 extra points) Stand up and recite the pledge perfectly. | Over your heart | Group Evaluation |
| C | Congress officially recognized the "Pledge of Allegiance" in 1942. In 1943, the Supreme Court ruled that public school students could not be forced to recite it. Since then it has generated | 1. The line "One Nation under God" violates the | Group Evaluation |

| Level | Question (including Bonus Question, if any) | Answer to Question | Answer to Bonus Question |
|---|---|---|---|
| | much controversy. Discuss one controversy. Bonus Question (worth 2 extra points) What is your opinion about saying the "Pledge of Allegiance" in school or at public events? | rule between separation of church and state. 2. Religious reasons | |
| C | Below is an excerpt from the poem "The New Colossus," written by Emma Lazarus: Give me your tired, your poor Your huddled masses Yearning to breathe free, The wretched refuse Of your teeming shore. Send these, the homeless, Tempest-tossed to me. I lift my lamp beside the golden door. She wrote the poem for what famous American landmark? Bonus Question (worth 2 extra points) Explain the meaning of the poem. | The Statue of Liberty | The statue stands as a symbol of freedom and hope to immigrants coming to the US for a better life. |
| C | In 1872, which president created the first national park called Yellowstone National Park? Bonus Question (worth 1 extra point) You receive an extra point if you can name a national park you have visited. | Teddy Roosevelt | Group Evaluation |
| B | Immigrants arriving by ship and entering the country in New York in the late 1850's were processed at ________ Island. | Ellis | |
| A | Name two of the four presidents on Mt. Rushmore. Bonus Question (worth 2 extra points) Take 2 extra points if you can name the other two. No extra points will be awarded if you only get one out of two. | Theodore Roosevelt, Abraham Lincoln, Thomas Jefferson, George Washington | Theodore Roosevelt, Abraham Lincoln, Thomas Jefferson, George Washington |
| C | Arlington National Cemetery is home to the "Eternal Flame" of which president? | John F. Kennedy | |
| B | What is suffrage? | The right to vote. | |
| C | In the continuing fight for equal opportunity, Congress passed an educational amendment called Title IX, which prohibits discrimination on the basis of sex in the use of federal funds for educational programs, including sports. How does this affect girls' sports programs? | Increases money for girls' sports programs because federal funds have to be allocated equally between boys and girls. | |
| C | By 1880, this man dominated 90% of the US oil industry. | John D. Rockefeller | |
| B | Name two of the reasons why 37 million immigrants came to the United States between 1870 and 1910. Bonus Question (worth 2 extra points) Explain why immigrants come to the United States today. | Freedom, economic opportunities, adventure, and a better life. | Freedom, economic opportunities, adventure, and a better life. |
| A | What is the name of this poem written by Katherine Lee Bates, which was later put to music by Samuel A. Ward? O beautiful for spacious skies, For amber waves of grain, For purple mountain majesties Above the fruited plain! America! America! God shed his grace on thee, And crown thy good with brotherhood From sea to shining sea. | "America the Beautiful" | |
| B | This famous speech delivered by Abraham Lincoln begins with the words "Four score and seven years ago our fathers brought forth on this continent, a new nation, conceived of liberty, and dedicated to the proposition that all men are created equal" and ends with the words on Stamp #15 on the game board. What is the name of this famous speech? Bonus Question (worth 2 extra points) What was the occasion when this speech was given? | The Gettysburg Address | Dedication of a soldiers' cemetery at Gettysburg |
| C | Famous American author F. Scott Fitzgerald coined the term Jazz Age, referring to which decade of fun, frolic and flappers? | Roaring 20's or 1920's | |
| B | In the mid-1800's, Ralph Waldo Emerson wrote a poem to honor the Minutemen. The poem included these well-known lines: "Here once the embattled farmer stood" and "fired the shot heard round the world." The Minutemen fought in which war? | Revolutionary War | |
| A | Which illustrator became popular for his more than 300 Saturday Evening Post magazine covers? | Norman Rockwell | |
| B | Which decade saw the rise of television as a form of communication and entertainment? Was it the 1940's, 1950's, or 1960's? Bonus Question (worth 2 extra points) Describe how television sets and television programs have changed since then. | 1950's | Black & white to color, cable & satellite, stereo, remote controls, more variety of programs: science, arts, news programs, etc. |
| B | The hope of all immigrants is to live the "American Dream." What does that mean? Bonus Question (worth 1 extra point) What does living the "American Dream" mean to you? | Improving one's social and economic condition to insure a better future for one's children. | Group Evaluation |
| B | This Stamp commemorates the organization that was founded during the Civil War. Which organization is it? Bonus Question (worth 2 extra points) Give two examples of when this organization might provide services to people in need. | Red Cross | Natural disasters, wars, famine, national crisis, etc |
| A | Explain what an immigrant is. Bonus Question (worth 2 extra points) Give yourself two extra points if you know who was the first in your family to immigrate to the United States. From what country did they come? | Someone who moves from his or her home country to begin a new life in another country. | Group Evaluation |

| Level | Question (including Bonus Question, if any) | Answer to Question | Answer to Bonus Question |
|---|---|---|---|
| C | The United Nations seeks peaceful solutions to disputes between nations through this main body which is dominated by five nations. What body is this? Bonus Question (worth 3 extra points) Who are the five nations? | The Security Council | United States, Britain, China, France, Russia |
| C | What is the definition of capital punishment? Bonus Question (worth 2 extra points) The US Constitution upholds capital punishment while many other countries have abolished it. Give an argument in favor of capital punishment and one against it. | The State executes a convicted criminal as punishment for their crime. | Group Evaluation |
| C | Define what a multinational company is. Bonus Question (worth 2 extra points) Give an example of one company and its product. | A company that provides goods and services around the globe. | Group Evaluation |
| B | Why should a citizen vote? | So they can have a voice in government. It is an expected responsibility of citizens in a democracy. | |
| A | You can still visit the home of this first American president in Virginia. Who was this president? Bonus Question (worth 2 extra points) What is the name of his home? | George Washington | Mount Vernon |
| B | Look on the board and find the stamp with the US seal on it. | First stamp above the Capital Building | |
| A | What is the largest library in the United States? Bonus Question (worth 1 extra point) Give yourself one extra point if you have a library card. | Library of Congress | Group Evaluation |
| C | How does a candidate for office finance his political campaign? Bonus Question (worth I extra point) Give yourself one extra point if you have ever donated money to a politician's campaign. Name the candidate you supported and the office he/she was running for. | Personal resources, government funding, political fund raising, private & business contributions | Group Evaluation |
| A | If you are buying a $10 gift and the sales tax is 7%, how much money do you need to buy it? Bonus Question (worth 2 extra points) Where does the sales tax go? | $10.70 | To state and local governments. |
| B | How many senators are there in Congress? Bonus Question (worth 2 extra points) Name the two senators from your state. | 100 (Two for each of the fifty states) | Group Evaluation |
| B | What two legislative bodies make up The Congress? | The Senate and The House of Representatives | |
| B | Who appoints new Supreme Court Justices? Bonus Question (worth 2 extra points) For how long do they serve? | President | For life |
| C | Chubby Checker made this dance and song famous in the 1950's. Name it. Bonus Question (worth 1 extra point) Give yourself one extra point if you can show the moves of this dance to the other players. | "The Twist" | Group Evaluation |
| A | Which saxophone playing Rhodes Scholar defeated George H. W. Bush for the presidency in 1992? Bonus Question (worth 2 extra points) Who served as his Vice President for both terms? | William Jefferson Clinton | Al Gore |
| B | In 1607, where did the English make the first permanent settlement in North America? Hint: You might want to check the board. | Jamestown | |
| A | "You might not recognize me. This is a picture of me in my younger days." Name two significant contributions of this American patriot to his country. | First president of the US, Commander in Chief of the Continental Army, founding father of the US Constitution | |
| A | Name the 3 branches of the federal government. Bonus Question (worth 2 extra points) Explain the phrase "checks and balances." | Executive, Legislative, Judicial | System by which each branch of government can check or control the action of the other branches. |
| C | Define the term "political party." Bonus Question (worth 2 extra points) Name two other political parties today besides Republicans and Democrats. | A group of people who share similar ideas about government and attempt to get elected to further their goals. | Green, Libertarian, Reform, American Independent, Natural Law |
| A | What is energy conservation and why is it important? Bonus Question (worth 2 extra points) Give one example of something you can do to conserve energy? | Not wasting energy. So there is enough to go around for everyone and so we don't deplete our resources. | Group Evaluation |
| A | The Constitution gives us the right to bear arms. Give one legal reason why people use guns. | Hunting, self-protection, defense of the nation, law enforcement | |

-continued

| Level | Question (including Bonus Question, if any) | Answer to Question | Answer to Bonus Question |
|---|---|---|---|
| B | One of the world's greatest historical and scientific museums is located in Washington, D.C. What is its name? | The Smithsonian Institute | |
| B | According to the Declaration of Independence, the duty of government is to do what? Bonus Question (worth 1 extra point) What do we call rights that belong to us and can never be taken away? | Protect the rights of the people. | Unalienable or inalienable rights |
| A | "We hold these truths to be self-evident: that all men are created equal; that they are endowed by their Creator with certain unalienable rights; that among these are life, liberty, and the pursuit of happiness." You will find these famous words in which document? | Declaration of Independence | |
| A | Congress officially adopted our National Anthem on Mar. 3, 1931. The original poem was written by Francis Scott Key during the War of 1812. What is the name of our National Anthem? Bonus Question (worth 2 extra points) Sing the National Anthem as well as you can. Good luck hitting those high notes. | "The Star-Spangled Banner" | Group Evaluation |
| A | "I am proud to be my country's flag." What do the white stars on the American flag stand for? Bonus Question (worth 2 extra points) What do the red, white and blue colors on the flag stand for? | One star for each state | White/truth, blue/honor, red/courage |

I claim:

1. A method of playing a game comprising:
   selecting, by a first player, a question card from one of a plurality of groups of question cards, each group of question cards associated with a difficulty level;
   proffering a response to the selected question card by the first player;
   assigning, by at least one second player in competition with the first player, a number of points based on a subjective evaluation, by the at least one second player, of the first player's proffered response and the difficulty level of the selected question card;
   advancing a player placeholder along a movement track based on the number of points assigned, wherein:
   the movement track comprises a plurality of images of postal stamps, each postal stamp bearing a number corresponding to the player's score at that point on the movement track, and
   the movement track forms a chronological timeline of historical events.

2. The method of claim 1, wherein the question card selection is made based on the first player's comparison between a potential quantity of points to be assigned upon answering the question card correctly with a potential risk associated with failing to answer the question card correctly.

3. The method of claim 1, wherein responding to the selected question card further comprises collaborating with one or more collaborating player.

4. The method of claim 3, wherein points are assigned to the first player and to the one or more collaborating players.

5. The method of claim 4, wherein points are assigned to the first player and to the one or more collaborating players in equal proportions.

6. The method of claim 1, wherein the selected question has a plurality of subparts, such that the first player proffers a response to each selected question subpart, and such that points are assigned to each response.

7. The method of claim 6, wherein a first selected question subpart comprises an objective question, and a second selected question subpart comprises a subjective question.

8. The method of claim 1, wherein a greater number of points is assigned for answering a question card associated with an increased difficulty level.

9. The method of claim 1, wherein at least a portion of the question cards relate to United States history, government and culture.

10. The method of claim 9, wherein at least a portion of the question cards are associated with a United States social studies educational curriculum.

11. A method of playing a game, comprising:
    selecting by a player question card from a plurality of question cards, at least a portion of the question cards containing a question relating to United States history, government or culture;
    proffering a response to a question on the selected question card by the player;
    assigning a number of points to said player based on a correct response to a question on said question card; and
    advancing a player placeholder along a movement track based on the number of points assigned to the player, the movement track comprising a plurality of stamps forming a generally chronological timeline of historical events, wherein the player placeholder moves through said historical events along said timeline.

12. The method of claim 11, wherein assigning a number of points to said player comprises assigning a designated number of points provided on the selected question card.

13. The method of claim 11, wherein assigning a number of points to said player comprises assigning, by at least one other player, a number of points based on a subjective evaluation, by the at least one other player, of said player's proffered response.

14. The method of claim 11, wherein at least a portion of the question cards contains questions that refer to said stamps on said movement track.

15. The method of claim 11, wherein said stamps contain images of historical events.

* * * * *